United States Patent
Dry et al.

(10) Patent No.: US 7,240,957 B2
(45) Date of Patent: Jul. 10, 2007

(54) AUTOMOTIVE OPEN BASE FOAM ARMREST ASSEMBLY

(75) Inventors: Alan George Dry, Grosse Pointe Woods, MI (US); Kerry Houser, Macomb, MI (US); Steve Citko, Macomb, MI (US); Donald Ketelhut, Chesterfield Township, MI (US); Mark S. Loehr, Auburn Hills, MI (US)

(73) Assignee: Lear Corporation, Southfield, MI (US)

( * ) Notice: Subject to any disclaimer, the term of this patent is extended or adjusted under 35 U.S.C. 154(b) by 233 days.

(21) Appl. No.: 10/905,603

(22) Filed: Jan. 12, 2005

(65) Prior Publication Data
US 2006/0152037 A1  Jul. 13, 2006

(51) Int. Cl.
*B60J 9/00* (2006.01)
(52) U.S. Cl. .................. 296/153; 296/146.7; 296/1.09; 29/91.1
(58) Field of Classification Search ............. 296/146.7, 296/146.1, 153, 1.09; 29/91.1
See application file for complete search history.

(56) References Cited

U.S. PATENT DOCUMENTS

| 6,248,205 | B1* | 6/2001 | Scheidmantel et al. ...... 296/153 |
| 6,893,077 | B1* | 5/2005 | DeJongh ...................... 296/153 |
| 6,986,543 | B2* | 1/2006 | Reed ........................... 296/153 |
| 7,070,221 | B2* | 7/2006 | Cowelchuk et al. ......... 296/153 |
| 2005/0200148 | A1* | 9/2005 | Bailey et al. ................ 296/1.09 |
| 2005/0200161 | A1* | 9/2005 | Reed et al. .................. 296/153 |
| 2005/0258666 | A1* | 11/2005 | Reed ........................... 296/153 |
| 2006/0200960 | A1* | 9/2006 | Reed et al. .................. 296/153 |

\* cited by examiner

*Primary Examiner*—Jason Morrow
(74) *Attorney, Agent, or Firm*—Earl LaFontaine, Esq.

(57) ABSTRACT

A method of manufacturing an automotive door armrest is provided and comprises molding an armrest support surface into a lower door panel. A frame assembly is formed to comprise at least one through socket having an open upper socket face and an open lower. The frame assembly is overmolded such that an overmold surface is formed over the open upper socket face. A foam bun is inserted into the lower socket face. The frame assembly is mounted onto the armrest support surface such that the foam bun becomes secured within the at least one through socket. The frame assembly is affixed to the lower door panel.

20 Claims, 2 Drawing Sheets

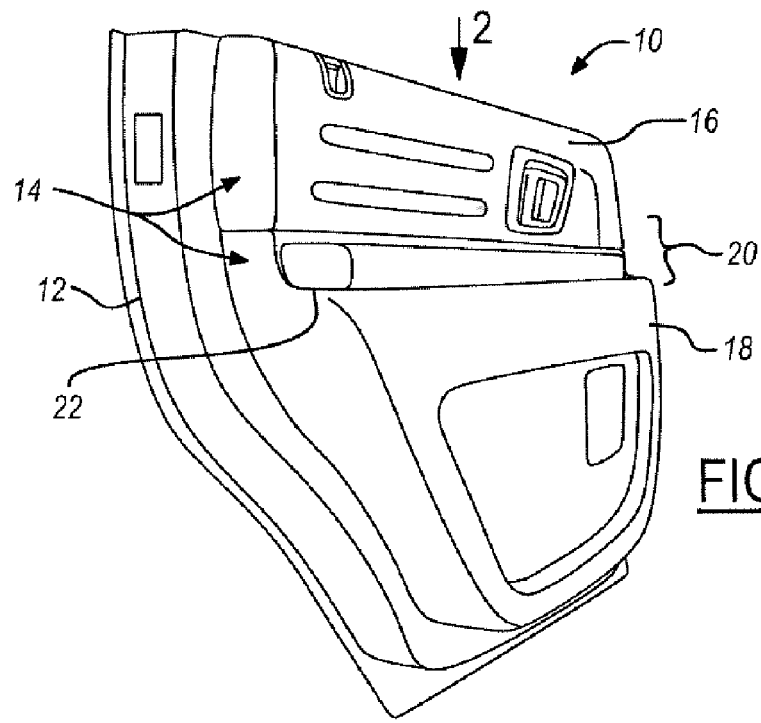
FIG. 1
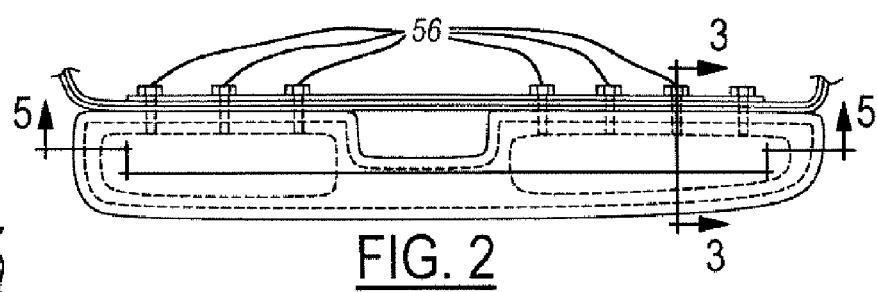
FIG. 2
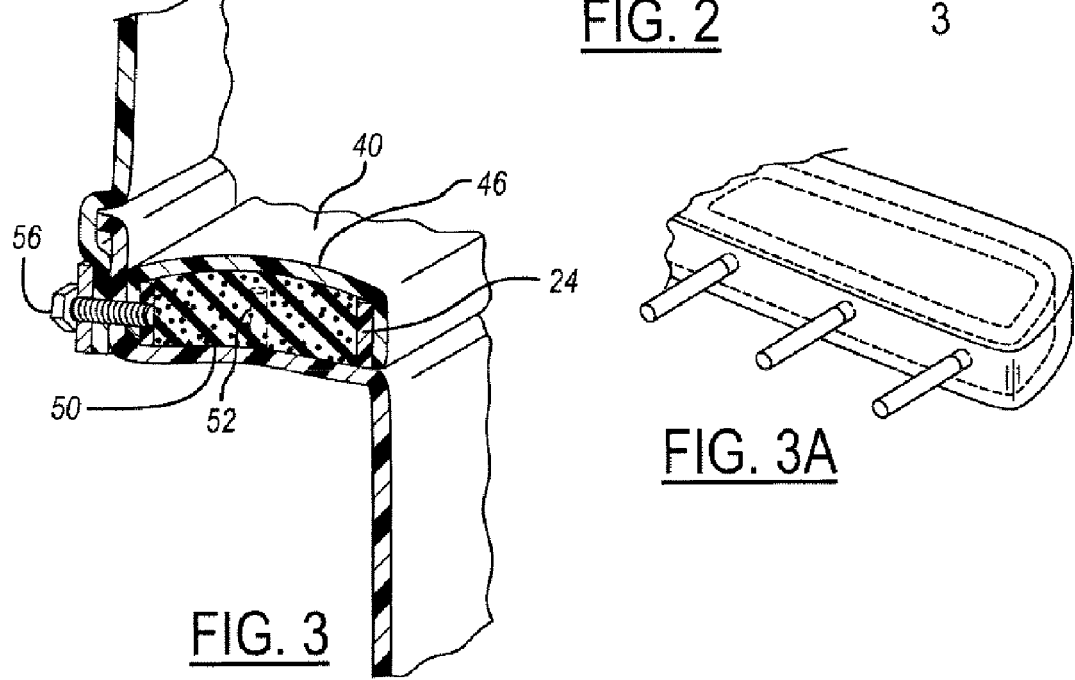
FIG. 3
FIG. 3A

AUTOMOTIVE OPEN BASE FOAM ARMREST ASSEMBLY

TECHNICAL FIELD

The present invention relates generally to an automotive armrest assembly and more particularly to a method for manufacturing an automotive armrest with reduced cost and complexity.

BACKGROUND OF THE INVENTION

Automotive manufacturing is driven by a host of factors that pervade even the most basic elements of design. Two of these that deserve considerable attention are weight and cost. These two factors are often inexorably intertwined as they both affect the underlying profitability of an automotive design. Weight is translated into efficiency of performance, which directly influences fuel economy. Fuel economy, in turn, is known to directly influence the marketing and profitability of automotive manufacturers.

Improvements to cost and weight of automotive design need not be solely implemented on large-scale elements within the automobile. Small scale elements represent incremental savings that quickly escalate into large profits when multiplied by the vast number of vehicles manufactured. In this fashion, design attention needs to be devoted towards improvements in smaller automotive assemblies such as interior finishes and trim features.

One such arena ripe for improvements is the automotive door assembly. These assemblies commonly involve a plurality of individually designed elements ranging from appearance based trim assemblies to complex electromechanical window and control systems. One trim assembly practically universal in automotive door design is the door armrest assembly. These assemblies are utilized by passengers to facilitate opening and closing the vehicle door. Additionally, they provide a comfortable rest for a passenger or driver's arm during vehicle operation. As such, they must commonly support vertical load from a passenger's arm, horizontal load from door closing, and padding for comfort. This is normally accomplished by providing a vertical support platform within the armrest assembly that provides support for the padding as well as support for passenger arm loading.

The use of such integrated vertical support platforms requires costly manufacturing of the armrest assembly in addition to resulting in increased weight of the trim. Manufacturing requires proper alignment of the platform and padding sub-assemblies prior to cover and sealing of the armrest. Finally, the sealed assembly must still be securely mounted to the door panel. Proper structural attachment often requires numerous attachment locations which in turn increases cost and weight. A method and apparatus that reduced complexity of the armrest assembly such that both cost and weight savings could be realized without a reduction in mounting rigidity would be highly beneficial and highly profitable.

It would therefore be highly desirable to have an armrest assembly with reduced complexity in manufacturing and number of components. It would further be highly desirable to have a reduced component armrest assembly that retains mounting rigidity.

SUMMARY OF THE INVENTION

It is therefore an object to the present invention to provide an armrest assembly with reduced manufacturing complexity. It is further an object of the present invention to provide such an armrest assembly with retained mounting rigidity.

In accordance with the objects of the present invention a method of manufacturing an automotive door armrest is provided that comprises molding an armrest support surface into a lower door panel. A frame assembly is formed to comprise at least one through socket having an open upper socket face and an open lower. The frame assembly is overmolded such that an overmold surface is formed over the open upper socket face. A foam bun is inserted into the lower socket face. The frame assembly is mounted onto the armrest support surface such that the foam bun becomes secured within the at least one through socket. The frame assembly is affixed to the lower door panel.

Other objects and features of the present invention will become apparent when viewed in light of the detailed description and preferred embodiment when taken in conjunction with the attached drawings and claims.

BRIEF DESCRIPTION OF THE DRAWINGS

FIG. 1 is an illustration of an automotive armrest assembly in accordance with the present invention, the automotive armrest assembly illustrated installed on an automotive door assembly.

FIG. 2 is a detailed illustration of the automotive armrest assembly illustrated in FIG. 1.

FIG. 3 is a cut-away illustration of the automotive armrest assembly illustrated in FIG. 1.

FIG. 3A is a detail of the automotive armrest illustrating heat-stake connection methodology.

DESCRIPTION OF PREFERRED EMBODIMENTS

Figure 4:
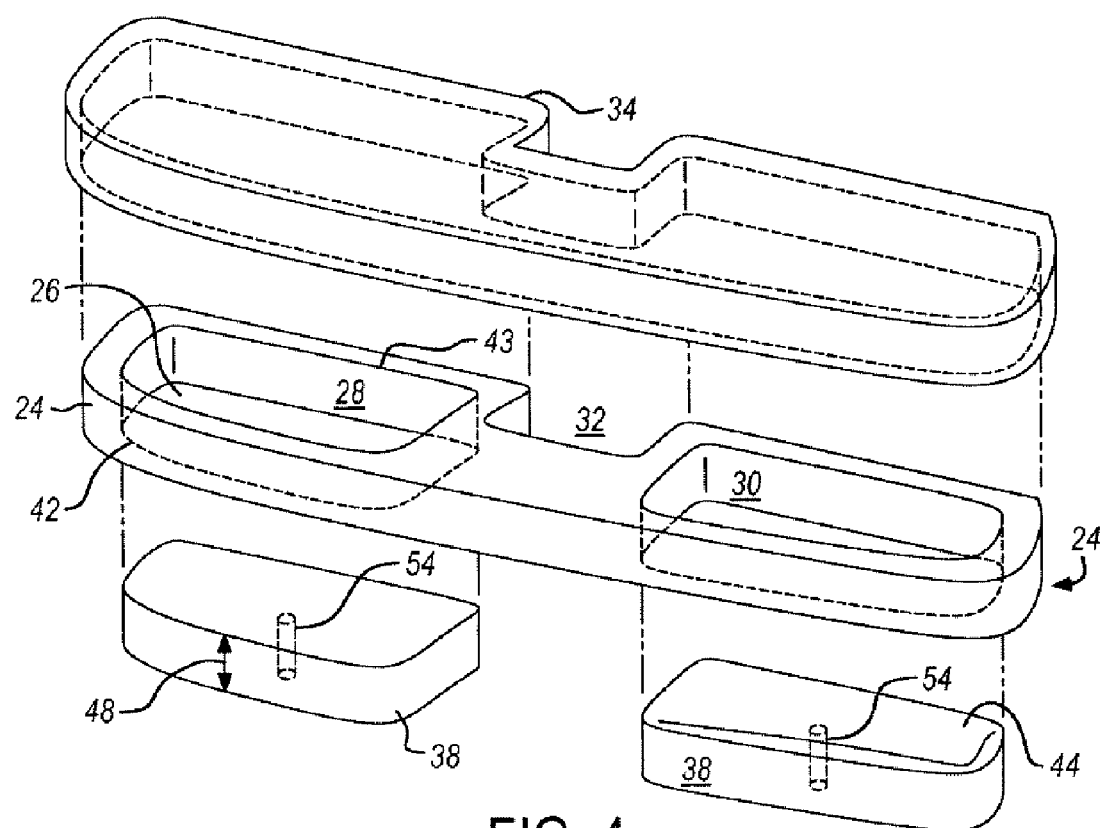
FIG. 4 is an exploded view illustration of the automotive armrest illustrated in FIG. 1.
Figure 5:
FIG. 5 is a cross-sectional illustration of the automotive armrest assembly illustrated in FIG. 2.

Referring now to FIG. 1, which is an illustration of an automotive door assembly 10 in accordance with the present invention. The automotive door assembly is comprised of an outer door panel 12 and an inner door panel assembly 14. The inner door panel assembly 14, in turn, is preferably comprised of an upper door panel 16 and a lower door panel 18. The present invention utilizes these door components in a unique fashion to provide an automotive door armrest assembly 20 with reduced manufacturing complexity and cost.

The automotive door armrest assembly 20 includes an armrest support surface 22 formed directly into the lower door panel 18. This preferably takes the form of a molded ledge formed in the lower door panel 18. The armrest support surface 22 is molded in a single form with the lower door panel 18 such that an independent vertical support element is not required by the automotive door armrest assembly 20. This functions as a simplification of assembly in addition to a part reduction factor. Furthermore, it allows the use of a simple frame assembly 24 as the sole basis for the automotive armrest (see FIGS. 2–4). The frame assembly 24 is preferably comprised of a perimeter frame generating at least one through socket 26. In one embodiment, the at least one through socket 26 is comprised of a forward socket 28, a rearward socket 30, and a handle feature 32.

Figure 6:
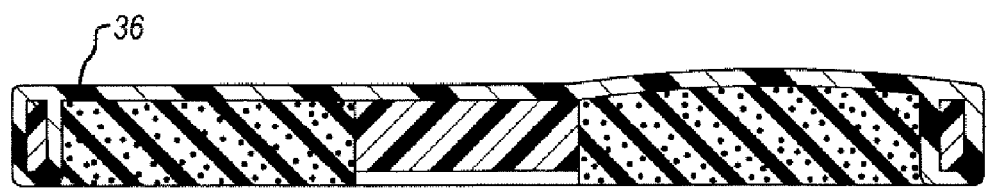
FIG. 6 is a cross-sectional illustration of an alternate embodiment of the automotive armrest assembly illustrated in FIG. 2.

The frame assembly 24 includes an overmold 34 generating an overmold surface 36 over the top of the automotive door armrest assembly 20. The overmold 34 is preferably a flexible overmold. There is at least one through socket 26 adapted such that a foam bun 38 may be inserted therein and provide compressible support to the overmold surface 36 such that a padded elbow region 40 or similar comfort region is generated. The foam bun 38 is inserted through an open lower socket face 42 and is compressed within the through socket 26 when the frame assembly 24 is mounted onto the armrest support surface 22. The open upper socket face 43 being sealed by the overmold 34. An independent platform is not required to support the foam bun 38. Although the overmold 34 need only cover the top of the through socket 26 as described, in an alternate embodiment, the overmold 34 may be applied such that it extends to cover the lower surface of the frame assembly 24. In this embodiment (see FIG. 6) the overmold 34 may cover the lower surface of the frame assembly 24 and enter the socket 26 to provide a seamless overmolded surface.

A variety of foam buns 38 are contemplated for use in the present invention. In one embodiment, die-cut foam pads are utilized to reduce cost and manufacturing complexity. The foam buns 38 may be formed using press-fit foam. In still another embodiment, the foam buns 38 may be molded. Using the die-cut process, molding, or other process a contoured upper pad surface 44 may be formed into the foam bun 38. When inserted into the through socket 26, the contoured upper pad surface 44 is used to generate an armrest overmolded contoured surface 46. In still another embodiment, a cost effective foam bun 38 with a uniform pad height 48 is utilized. In this embodiment, an armrest support contour 50 may be molded or otherwise formed into the armrest support surface 22. The armrest support contour 50 displaces the uniform height foam bun 38 to generate the armrest overmolded contoured surface 46. Furthermore, a locator element 52 may also be formed into the armrest support surface 22 and be adapted to engage a locator slot 54 formed in the foam bun 38. This allows a simple but highly effective method of locating the armrest assembly 20. The locator element 52 need not be utilized and the foam bun 38 may be held in position by simple friction-fit within the socket 26 or through the use of adhesives such as double back tape.

Finally, the present invention contemplates a variety of methods of mounting the frame assembly 24 to the lower door panel 18. Since the armrest support surface 22 is integrated into the lower door panel 18, bulky platforms and securing elements are not required to provide vertical support for a passengers arm. The frame assembly 24 may be mounted with laterally orientated mounting elements 56 such as snaps or bolts. The use of only laterally orientated elements allows for the mounting attachments to be easily attached and detached. The use of the support surface 22 allows such mounts to be designed to provide minimal if any vertical support to the frame assembly 24. As such, attachment methodologies such as heat stakes 56 (see FIG. 3A) may be used as the mounting elements 56.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A method of manufacturing an automotive door armrest comprising:
   molding an armrest support surface into a lower door panel;
   forming a frame assembly comprising at least one through socket having an open upper socket face and an open lower socket face;
   overmolding said frame assembly such that an overmold surface is formed over said open upper socket face;
   inserting a foam bun into said lower socket face;
   mounting said frame assembly onto said armrest support surface such that said foam bun becomes secured within said at least one through socket; and
   affixing said frame assembly to said lower door panel.

2. A method as described in claim 1, further comprising:
   molding said foam bun such that said foam bun is adapted to fit within said at least one through socket.

3. A method as described in claim 1, further comprising:
   overmolding said frame assembly such that said overmold surface extends into said lower socket face.

4. A method as described in claim 1, where said foam bun comprises:
   a die cut foam pad.

5. A method as described in claim 4, further comprising:
   die cutting said foam pad such that said foam pad comprises a contoured upper pad surface;
   forcing said overmold surface to conform to said contoured upper pad surface by way of inserting said foam pad into said at least one through socket.

6. A method as described in claim 4, further comprising:
   die cutting said foam pad to form a uniform pad height;
   forming an armrest support contour onto said armrest support surface;
   inserting said foam pad into said lower socket face
   mounting said frame assembly onto said armrest support surface such that said armrest support contour protrudes into said at least one through socket, said armrest contour displacing said foam pad such that an armrest overmolded contoured surface is generated in said overmold surface.

7. A method as described in claim 1, further comprising:
   forming at least one locator element onto said armrest support surface;
   forming at least one locator slot within said foam pad; and
   positioning said frame assembly on said armrest support surface by way of placing said at least one locator element into said at least one locator slot.

8. A method as described in claim 1, wherein said overmold surface comprises a vinyl overmold surface.

9. A method as described in claim 1, wherein said foam pad comprises press-fit foam frictionally secured within said at least one through socket.

10. A method as described in claim 1, further comprising:
    a plurality of laterally orientated mounting elements securing said frame assembly to said lower door panel, said laterally orientated mounting elements providing the only vertical mounting resistance.

11. A method of manufacturing an automotive door armrest comprising:
    molding an armrest support surface into a lower door panel;

forming a frame assembly comprising at least one through socket having an open upper socket face and an open lower socket face;

overmolding said frame assembly such that an overmold surface is formed over said open upper socket face, said overmold surface forming a padded elbow region;

inserting a foam bun into said at least one through socket, said foam bun generating compressible support to said padded elbow region;

mounting said frame assembly onto said armrest support surface such that said foam bun becomes secured within said at least one through socket, said armrest support surface vertically supporting said foam bun.

12. A method as described in claim 11, where said foam bun comprises:

a die cut foam pad.

13. A method as described in claim 12, further comprising:

die cutting said foam pad such that said foam pad comprises a contoured upper pad surface;

forcing said overmold surface to conform to said contoured upper pad surface by way of inserting said foam pad into said at least one through socket.

14. A method as described in claim 12, further comprising:

die cutting said foam pad to form a uniform pad height;

forming an armrest support contour onto said armrest support surface;

inserting said foam pad into said lower socket face mounting said frame assembly onto said armrest support surface such that said armrest support contour protrudes into said at least one through socket, said armrest contour displacing said foam pad such that an armrest overmolded contoured surface is generated in said overmold surface.

15. A method as described in claim 11, further comprising:

forming at least one locator element onto said armrest support surface;

forming at least one locator slot within said foam bun; and positioning said frame assembly on said armrest support surface by way of placing said at least one locator element into said at least one locator slot.

16. A method as described in claim 11, further comprising:

a plurality of laterally orientated mounting elements securing said frame assembly to said lower door panel, said laterally orientated mounting elements providing the only vertical mounting resistance.

17. An automotive door armrest assembly comprising:

a lower door panel molded to form an armrest support surface;

a frame assembly comprising at least one through socket having an open upper socket face and an open lower socket face;

an overmold surface molded over said open upper socket face to form a padded elbow region;

a foam bun inserted into said through socket, said frame assembly mounted to said lower door panel such that said armrest support surface presses said foam bun into said padded elbow region.

18. An automotive door armrest assembly as described in claim 17, wherein said overmold surface is molded into said open lower socket face.

19. An automotive door armrest assembly as described in claim 17, further comprising:

an armrest support contour formed onto said armrest support surface, said armrest support surface displacing said foam bun such that an armrest overmolded contoured surface is generated at said padded elbow region.

20. An automotive door armrest assembly as described in claim 17, further comprising:

at least one locator element formed into said armrest support surface; and at least one locator slot positioned within said foam bun, said at least one locator slot adapted to engage said locator element such that said foam bun is properly positioned on said armrest support surface.

* * * * *